W. C. BROWN.
AUTOMOBILE TAIL LIGHT INDICATOR.
APPLICATION FILED JULY 29, 1910.
1,199,867.
Patented Oct. 3, 1916.
Fig. 1
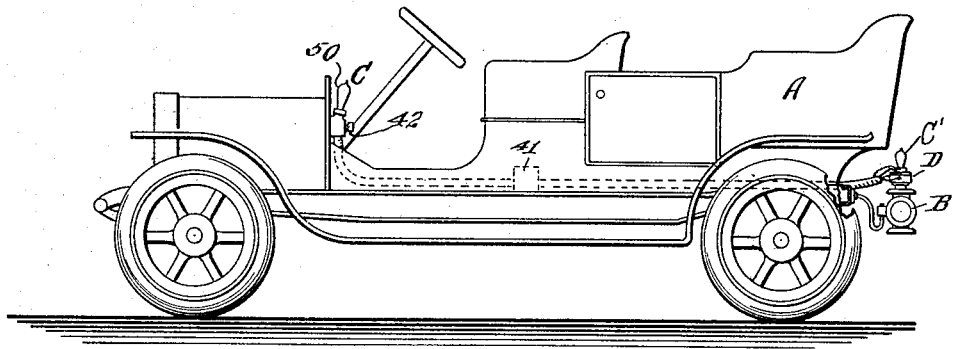
Fig. 2.
Fig. 3.
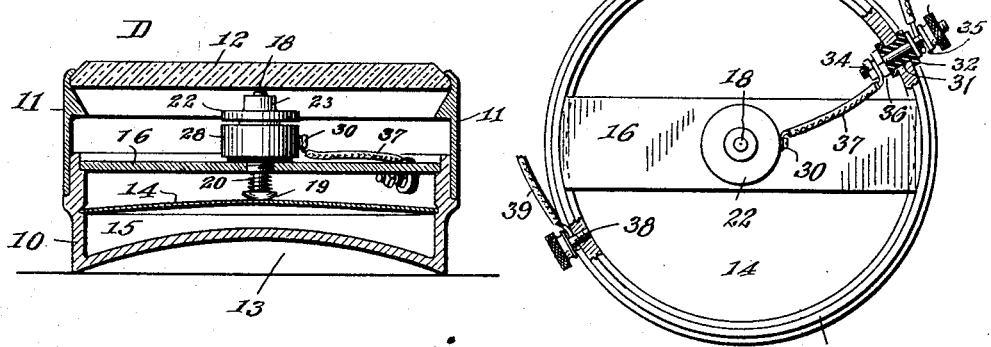
Fig. 4.
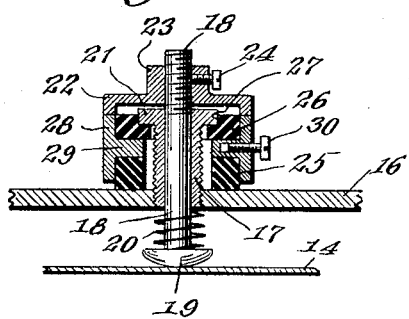
WITNESSES
H. Crocheron
L. Richards
INVENTOR
W. C. Brown
BY
McGrath
ATTORNEY

UNITED STATES PATENT OFFICE.

WILBUR C. BROWN, OF FOSTORIA, OHIO.

AUTOMOBILE-TAIL-LIGHT INDICATOR.

1,199,867.      Specification of Letters Patent.      Patented Oct. 3, 1916.

Application filed July 29, 1910. Serial No. 574,466.

*To all whom it may concern:*

Be it known that I, WILBUR C. BROWN, a citizen of the United States, and a resident of Fostoria, Seneca county, State of Ohio, have invented certain new and useful Improvements in Automobile-Tail-Light Indicators, of which the following is a specification.

This invention relates to tail light indicators for automobiles or other vehicles of transportation, and especially to such a device that will indicate whether or not the tail light of an automobile is burning, although it may be used for other purposes.

One form of the device is set forth in the hereinafter description and illustrated in the accompanying drawing which forms a part of this application.

Referring to the drawing, in which the same reference character indicates the same part in the several views: Figure 1 is a side elevation of an automobile showing the device applied thereto. Fig. 2 is a horizontal section of the means for operating the indicator. Fig. 3 is a plan view of the same with the cover thereof removed. Fig. 4 is an enlarged horizontal detail view.

The part lettered A on the drawing represents an automobile and B is the tail light or lamp carried thereby.

C is the indicator which may be a lamp as shown, or a bell, drop or any other signal. D represents the device for automatically operating said signal. This device consists of a casing 10 having a cover 11, 12 being a glass disk secured to the face of the cover. The bottom of the casing 13 is rounded or curved to fit the top of the tail lamp.

14 is a diaphragm which is fitted air tight in the casing and forms with the bottom of the casing an air tight chamber 15 which may contain air, gas or a fluid.

16 is a bridge which spans the casing 10.

17 is a bushing which is screwed through the bridge. Passing loosely through the bushing 17 is a pin 18 having a head 19 on the lower end thereof which is in contact with the diaphragm 14.

20 is a spiral spring which surrounds the lower end of the pin, one end of the spring resting against the lower end of the bushing, and the other against the head of the pin and keeps the head of the pin in contact with the diaphragm 14.

The upper end of the bushing 17 is provided with a flange 21 for the purpose hereinafter described.

22 is a disk having a hub 23 which is screw threaded on the upper end of the pin 18.

24 is a set screw passing through the hub to secure the disk at a fixed position on the pin.

25 and 26 are insulating rings surrounding the bushing 17. The upper bushing 26 is provided with a recess 27 into which fits the flange 21 of the bushing.

28 is a band or collar on the outside of the insulating rings. This collar is provided with an inwardly projecting flange 29 which fits between the two rings 25 and 26. 30 is a binding screw or post which is screw threaded into the said collar.

As seen, the lower ring 25 rests on the bridge 16 and extends below the lower edge of the band or collar 28 so that said collar will not come in contact with the bridge 16. The upper edges of said collar 28 and the insulating ring 26 are on substantially the same plane, and in certain positions of the parts the disk 22 is in contact with the upper edge of the collar 28.

The wall of the casing 10 is provided with an opening 31 into which fits a flanged insulating bushing 32. Projecting through this bushing is a pin screw threaded at each end and provided with nuts 33 and 34 to form binding posts 35 and 36. Leading from the binding screw 30 to the inner binding post 36 is the conducting wire 37. The wall of the casing is provided with another binding post 38 and leading from this post is the conducting wire 39, and from the binding post 33 is a conducting wire 40. These wires are connected to the indicator C, and in the circuit is a suitable source of electric current, such as a battery 41. In the circuit, at any convenient place, is located a suitable switch 42. Of course, it is to be understood that the casing and all connections, except the rings 25 and 26, are made of electric conducting material. However, it is immaterial of what the diaphragm 14 is made, except that it is flexible.

The operation of the device is as follows: Assuming the parts to be arranged and connected, as described, the switch 42 is thrown to complete the circuit and the tail lamp B is unlighted; under such conditions the diaphragm will be in its normal position, as shown in Fig. 4, with the disk 22 in contact with the collar 28, and the circuit will be completed coming in through the binding posts 35, 36, through the conducting wire 37 to the post 30, through the ring or collar 28, through the disk 22, the pin 18, the bushing 17, the bridge 16 to the casing 10; out through the binding post 38, through the conducting wire 39, through the indicator 50 and back to the source of electric energy, the battery 41. In this position, of course, the indicator will show that the lamp is unlighted. When the lamp B is lighted the heat therefrom will heat the casing 10, expand the air or other gas or liquid in the chamber 15, flex the diaphragm 14 upwardly, as shown in Fig. 2, whereupon the pin 18 is lifted against the tension of the spring 20, and the disk 22 is moved out of contact with the collar 28, whereupon the circuit will be broken and the indicator C will show that the lamp is burning. Should the light be accidentally or otherwise extinguished the gas or liquid in the chamber 15 will condense upon the cooling off of the casing, the diaphragm 14 will resume its normal position and the spring 20 will move the pin 18 down which will bring the disk 22 in contact with the collar 28, completing the circuit, whereupon the indicator C will show that the lamp is out.

The switch 42 is used to break the circuit when the apparatus is not in use, or for any other reason.

While I have shown the parts so arranged that the signal light will be flashed or other signal made when the tail light is extinguished, it is apparent that the parts may be so reversed that the said signal light will burn as long as the tail lamp is lighted and will be extinguished or cut off automatically when the said tail light is extinguished.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

In some cases I may place at the rear of the vehicle, preferably on top of the device D, a signal, such as the lamp C′ in circuit, which will flash when the tail light B is out. By placing a lamp in the position shown at C′ at the rear of the vehicle I obtain a very decided advantage because it will be seen that when the main lamp B is extinguished the emergency lamp C′ will be lighted so that by the use of my device there will be at all times a light in the rear of the vehicle, the emergency lamp taking the place of the main lamp when the main lamp is extinguished and the emergency lamp being extinguished when the main lamp is lighted.

In some cases instead of using my device for a vehicle, I may use it in stationary devices—for example—in semaphore apparatus to indicate to the tower man that a signal light on the track is out.

Having now described my invention, what I claim as new and desire to secure by Letters Patent is:

1. In a device of the class described, a casing, a diaphragm forming therewith a chamber, means for spanning the casing, a pin extending through the said means and resting on the diaphragm, a spring surrounding the pin and holding the same in contact with the diaphragm, a contact carried by said pin, a collar carried by and insulated from the said means, and electric connections extending from said contact and from said collar.

2. In a device of the class described, a casing, a diaphragm in the casing and forming therewith a gas or fluid chamber, a device extending across said casing, a bushing carried by the said device, a pin extending through said bushing, a spring surrounding the pin and holding the same normally in contact with the diaphragm, a disk secured to the pin, a non-conducting ring surrounding the bushing, and a collar secured to the ring and out of contact with the said device.

3. In a device of the class described, a casing having a curved bottom, a flexible diaphragm secured in said casing and forming therewith an air tight chamber containing a gas or fluid, a rigid element extending across said casing, a bushing having a flange at the upper end thereof secured to said rigid element, a pin extending through said bushing, one end resting against the diaphragm, a spring surrounding the pin to hold the same in contact with the diaphragm, an adjustable disk secured to the other end of the pin, insulating rings surrounding the bushing, one of the rings being engaged by the flange of the bushing, a collar having an inwardly projecting flange surrounding the rings, said flange being between and separating the rings, the lower ring holding the collar out of contact with the rigid element, electric connections leading from said collar and extending through the wall of the casing, and another connection extending through the wall of the casing at another point therein.

In witness whereof I have hereunto set my hand in the city, county and State of New York, this second day of July, 1910.

WILBUR C. BROWN.

In presence of—
 AGNES C. O'CONNELL,
 ISABEL R. RICHARDS.

Copies of this patent may be obtained for five cents each, by addressing the "Commissioner of Patents, Washington, D. C."